(12) United States Patent
Lu

(10) Patent No.: US 8,052,287 B2
(45) Date of Patent: Nov. 8, 2011

(54) CARRIER APPARATUS FOR AN OPTICAL ENGINE

(75) Inventor: Chang-Hsing Lu, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 784 days.

(21) Appl. No.: 11/533,027

(22) Filed: Sep. 19, 2006

(65) Prior Publication Data
US 2007/0108028 A1  May 17, 2007

(30) Foreign Application Priority Data
Nov. 16, 2005  (TW) .................. 94140348 A

(51) Int. Cl.
*G03B 21/14* (2006.01)
(52) U.S. Cl. ....................... 353/119; 248/917
(58) Field of Classification Search .............. 353/112, 353/119, 77; 248/917, 748; 153/119, 77
See application file for complete search history.

(56) References Cited

U.S. PATENT DOCUMENTS
6,059,413 A * 5/2000 Okubo ..................... 353/77
6,913,237 B2 * 7/2005 Lin et al. ................. 248/424

* cited by examiner

*Primary Examiner* — Que T Le
*Assistant Examiner* — Jerry Brooks
(74) *Attorney, Agent, or Firm* — Patterson Thuente Christensen Pedersen, P.A.

(57) ABSTRACT

A carrier apparatus for use with an optical engine of a projection device is disclosed. The carrier apparatus includes a main frame and a support frame which is removably disclosed on the main frame. An adjustable mechanism includes a push device and an adjustable device. The push device is disposed onto an end portion of the support frame, while the adjustable device is disposed onto the push device. Operating the adjustable device can locally change the height of the support frame with respect to the main frame, thereby precisely positioning the optical engine in a suitable manner so that the image projected on the screen can be uniform without distortion.

8 Claims, 3 Drawing Sheets

CARRIER APPARATUS FOR AN OPTICAL ENGINE

CROSS-REFERENCES TO RELATED APPLICATIONS

Not applicable.

BACKGROUND OF THE INVENTION

1. Field of the Invention

The present invention relates to a carrier apparatus. In particular, it relates to a carrier apparatus for use with the optical engine of a projection apparatus. The height of the optical engine is adjustable with respect to the main frame.

2. Descriptions of the Related Art

In recent years, projector markets have well developed, quickly improving the quality of the products. Projectors play important roles in home entertainment and conference environments. However, because projectors are precise optical devices, any deviation from the light paths generated from the optical elements can cause imperfect output images, thus, reducing the imaging quality of the product.

Using a rear projection apparatus as an example, an optical engine must usually be attached to a carrier apparatus for fixation onto the housing of the projection apparatus. Even though the optical paths inside the optical engine have been ideally set and precisely adjusted, it is still very possible for the whole displayed image to tilt (which means the height of the image is uneven), even after the optical engine is associated with the carrier apparatus. In this case, the image displayed by the optical engine will be presented as a non-uniform rectangle (generally, a trapezoid), or even distorted to an irregular shape. This results in the decrease of the end product quality and therefore makes the product less competitive.

In general, the rear projection device is quite bulky. It is very difficult for a consumer, who has no specialized tools, to adjust the interior optical engine so that it is uniform in height and able to present a better image output. Thus, the adjustment work should be done before the products leave the factory. In the case of a malfunction, the product would need to be sent back to the factory for repair because the professional technicians would be able to implement the adjustment work. The factory technicians would than, among other traditional measures, insert support cushions or pads into the space between the optical engine and the carrier apparatus to assist in uniformly adjusting the level of the optical engine in light of the carrier apparatus. Unfortunately, this adjustment creates an unstable product. The process is also cost- and time-ineffective, making the projection product less competitive in the market.

Thus, it is critical to invent a product that not only simplifies the assembly and repair process, but also precisely and readily adjusts the relative level of an optical engine.

SUMMARY OF THE INVENTION

The primary object of this invention is to provide a carrier apparatus for adjusting the relative level of an optical engine. The carrier apparatus allows for the optical engine to easily fix itself onto the projection apparatus, while providing a fast, effective and precise adjustment of the relative height of the optical engine. The carrier apparatus comprises a main frame, a support frame and an adjustable mechanism. The adjustable mechanism comprises a push device and an adjustable device. The push device is disposed onto an end portion of the support frame. The support frame is removably disposed on the main frame to support and adjust the position and level of the optical engine. The adjustable device is disposed onto the push device to at least partially adjust the height of the end portion of the support frame with respect to the main frame In arranging the elements more simply, the push device further comprises two push inclines, and the support frame comprises a pushed portion which is formed on a bottom of the end portion of the support frame. At least one of the push inclines is in shiftable contact with the pushed portion, so that the height of the end portion of the support frame can be adjusted by the adjustable device.

The carrier apparatus further comprises a fixed plate which is disposed on the top of the main frame. The carrier apparatus further comprises a fastening device for positioning the end portion of the support frame to the top on the main frame. The end portion of the support frame forms a recess with the bottom thereof, thus, defining the pushed portion. The adjustable device connects the push device to the fixed plate and creates an adjustable distance between the push device and the fixed plate. Regulating the adjustable device causes the two push planes to shift with respect to the pushed portion.

The adjustable device comprises two adjust screws and an elastic-biasing device. The two adjust screws are symmetrically disposed on the back side of the push device to independently adjust the level of the two push planes, allowing for shiftable contact with the pushed portion. The elastic-biasing device is disposed between the main frame and the end portion of the support frame to permanently place the end portion of the support frame close to the main frame.

The support frame further comprises two flanks, each disposed on the two sides of the recess. The fastening device comprises two screws which fix the support frame to the main frame through the two flanks. Each screw comprises a head and a body. The elastic-biasing device comprises two springs. Each spring is disposed onto the body of the screws, and fixed between the head of each of the screws and the flanks, thereby providing a downward force on each flank.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
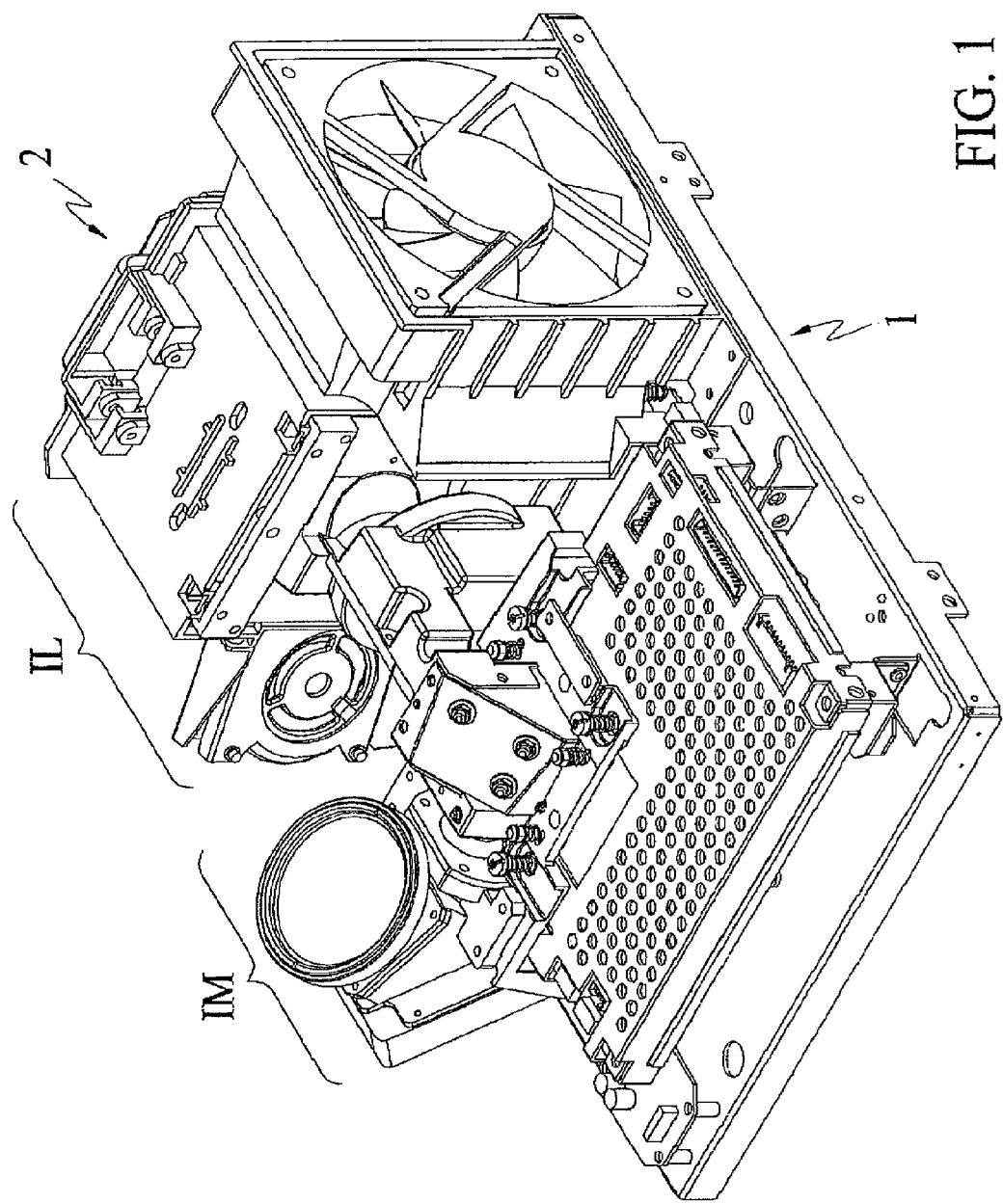
FIG. 1 is a schematic view illustrating the relative relation between a carrier apparatus and a rear-projection type optical engine of the present invention.

FIG. 1 is a schematic view illustrating the relative position between the carrier apparatus 1 and the optical engine 2 of the present invention. The optical engine, at the least, comprises an illumination device (IL) and an imaging device (IM). The preferred embodiment of the present invention primarily focuses on the adjustment of the level of the side where the imaging device (IM) is located because the imaging device (IM) usually influences the image quality more significantly than does the illumination device (IL). However, it does not mean that the position of the carrier apparatus 1 is limited to the embodiment as set forth in the descriptions.

Figure 2:
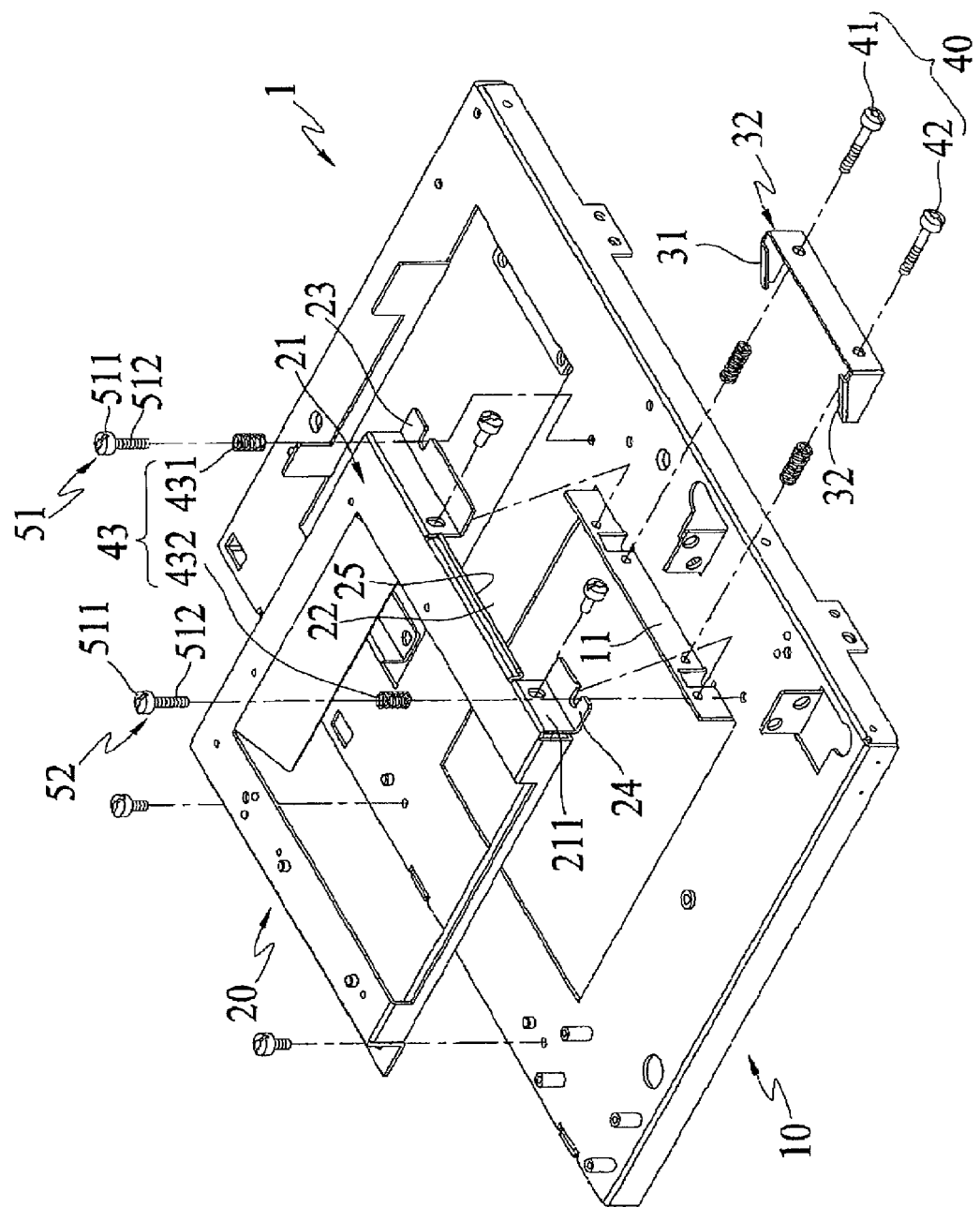
FIG. 2 is an exploded, three-dimensional schematic diagram illustrating the preferred embodiment of the carrier apparatus according to the present invention.
Figure 3:
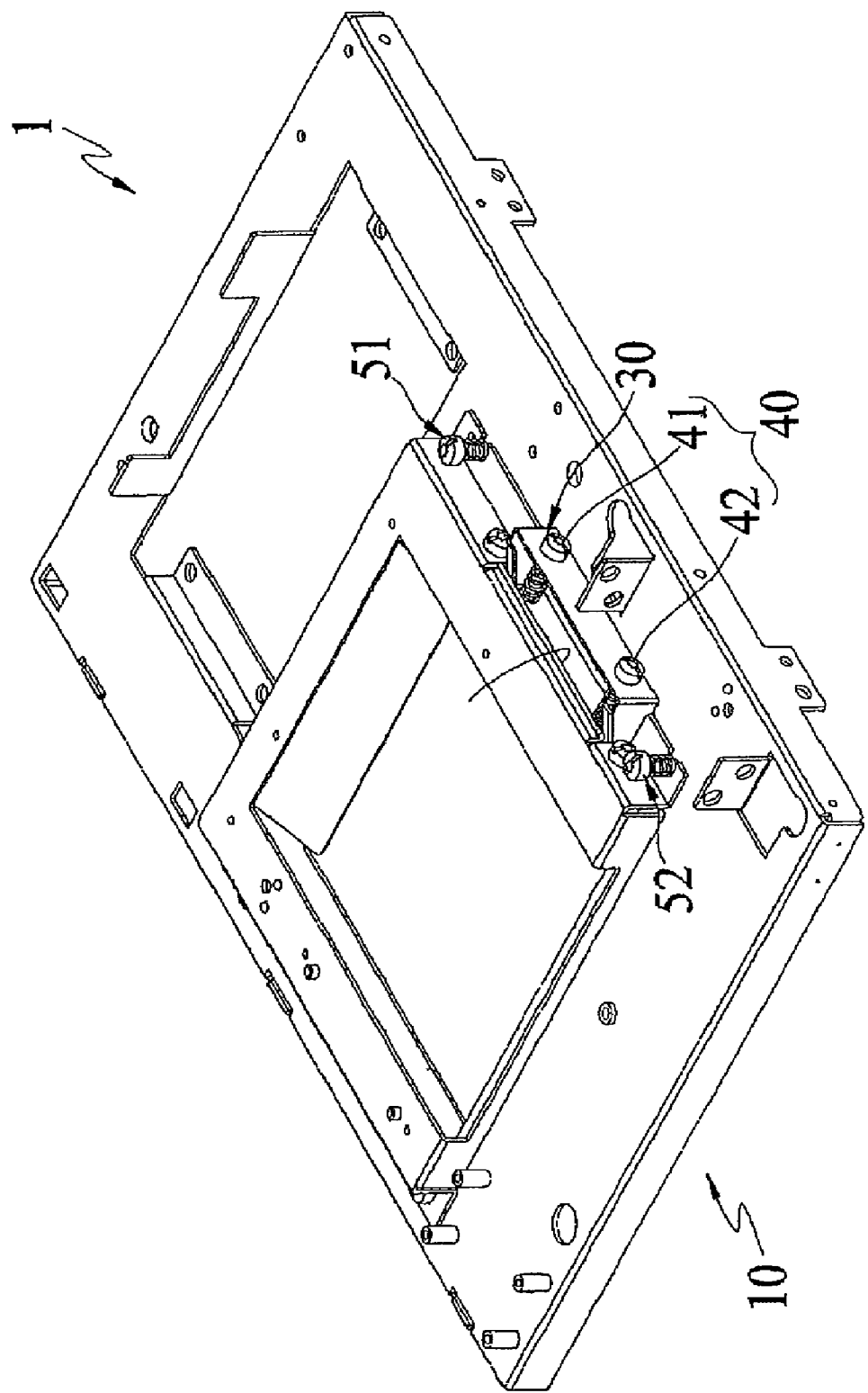
FIG. 3 is a view illustrating the assembled status in FIG. 2.

FIG. 2 and FIG. 3 illustrate the carrier apparatus 1 comprising a main frame 10 and a support frame 20. The support frame 20 is detachably disposed on the main frame for supporting and adjusting the position and level of the optical engine. The support frame 20 further comprises an end portion 21 and a pushed portion 25. The pushed portion 25 is formed on the bottom of the end portion 21. Preferably, the end portion 21 is defined by the rear edge 211 of the support frame 20. The carrier apparatus comprises a fastening device (referred to in the following descriptions) which positions the end portion 21 of the support frame 20 on the top of the main frame 10.

The carrier apparatus 1 further comprises an adjustable mechanism which comprises a push device 30 and an adjustable device 40. The push device 30 is disposed onto the end portion 21, namely the rear edge 211. The adjustable device 40 is disposed onto the push device 30 so that the operation of the adjustable device 40 can locally control the height or level of the rear edge 211 of the support frame 20 relative to the main frame 10.

The push device 30 comprises at least a push incline 31. Preferably, the push device 30 comprises two push inclines 31, 32. At least one of the two push inclines 31, 32 is in shiftable contact with the pushed portion 25 so that the height of the end portion 21 of the support frame 20 can be partially controlled by the adjustable device 40. In addition, the two push inclines 31, 32 should preferably be in shiftable contact with the pushed portion 25 so that the level of the end portion 21 of the support frame 20 can be adjusted evenly by the adjustable device 40.

The carrier apparatus 1 further comprises a fixed plate 11 which is disposed on the top of the main frame 10. The rear edge 211 of the support frame 20 is formed with a recess 22. Preferably, the bottom of the recess 22 is adapted to define the pushed portion 25. The adjustable device 40 connects the push device 30 to the fixed plate 11 and creates an adjustable distance between the push device 30 and the fixed plate 11. Regulating the adjustable device 40 allows for the two push inclines 31, 32 shifting with respect to the pushed portion 25.

Preferably, the adjustable device 40 further comprises two adjustable screws 41, 42 and an elastic-biasing device 43. The two adjustable screws 41, 42 are symmetrically disposed on the back side of the push device 30 to independently adjust the two push inclines 31, 32 shifting with respect to the pushed portion 25. The elastic-biasing device 43 is disposed between the main frame 10 and the end portion 21 of the support frame 20 to allow for the end portion 21 of the support frame 20 to be close to the main frame 10.

As mentioned above, the support frame 20 further comprises two flanks 23, 24, disposed on the two opposite side of the recess. The fastening device comprises two screws 51, 52, which fix the support frame 20 to the main frame 10 through the two flanks 23, 24. Preferably, each of the screws 51, 52 comprises a head 511 and a body 512. The elastic-biasing device 43 comprises two springs 431, 432. Each spring is disposed around the body 512 of the screws 51, 52, and is positioned between the head 511 and each of the flanks 23, 24 to provide a downward force on the flanks 23, 24.

In summary, with reference to FIG. 2 and FIG. 3, whether the user regulates the adjustable screws 41, 42 independently or simultaneously, the relative position between the push device 30 and the support frame 20 can still be adjusted, while supporting the support frame 20, and separately or evenly adjusting the level of the optical engine 2.

The above descriptions are provided for illustrating the concept, efficacy and technical features of the present invention. The scope that the present invention provides for cannot be limited. People skilled in this field may proceed with a variety of modifications and replacements based on the disclosures and suggestions of the invention as described without departing from the characteristics thereof. For instance, the adjustable mechanism can be disposed onto an opposing front edge or a lateral edge of the support frame 20. The push structures can also be replaced by other equivalent mechanisms similarly adjust the level of the support frame and optical engine. Nevertheless, although such modifications and replacements are not filly disclosed in the above descriptions, they have substantially been covered in the following claims as appended.

What is claimed is:

1. A carrier apparatus for use with an optical engine, comprising:
    a main frame, having a top;
    a support frame, removably disposed on the main frame for supporting and adjusting a position of the optical engine; the support frame comprising a top surface and the top surface comprising a front edge, two lateral edges and a rear edge, wherein the rear edge of the support frame is an end portion;
    wherein:
    the carrier apparatus further comprises an adjustable mechanism which includes:
    a push device, disposed on the end portion of the support frame and directly contacting and supporting the rear edge of the support frame;
    an adjustable device, disposed on the push device and the adjustable device comprising two adjustable screws, symmetrically disposed on a back side of the push device and disposed vertical to the rear edge of the support frame and parallel to the two lateral edges of the support frame for at least partially adjusting a height of the end portion of the support frame along a vertical direction with respect to the main frame, wherein the vertical direction is substantially perpendicular to a light path of the optical engine, the top of the main frame and the top surface of the support frame.

2. The carrier apparatus as claimed in claim 1, wherein the push device comprises at least a push incline, and the support frame further comprises a pushed portion which is formed on a bottom of the end portion of the support frame; the at least one push incline is in shiftable contact with the pushed portion so as to adjust the height of the end portion of the support frame by the adjustable device.

3. The carrier apparatus as claimed in claim 2, wherein the push device comprises two push inclines, at least one of the two push inclines is in shiftable contact with the pushed portion to adjust the height of at least a portion of the end portion of the support frame by the adjustable device.

4. The carrier apparatus as claimed in claim 3, wherein the two push inclines are in shiftable contact with the pushed portion to evenly adjust the height of the end portion of the support frame by the adjustable device.

5. The carrier apparatus as claimed in claim 4, wherein:
    the carrier apparatus further comprises a fixed plate which is disposed on the top of the main frame;
    the end portion of the support frame is formed with a recess of which a bottom thereof defines the pushed portion; and
    the adjustable device connects the push device to the fixed plate and creates an adjustable distance between the push device and the fixed plate, whereby the adjustable device is operated to adjust the distance, whereas the two push inclines are in shiftable contact with the pushed portion.

6. The carrier apparatus as claimed in claim 5, wherein the adjustable device comprises an elastic-biasing device, the elastic-biasing device is disposed between the main frame and the end portion of the support frame to make the end portion of the support frame constantly connect to the main frame, and the two adjustable screws, symmetrically disposed on the back side of the push device to independently adjust a shiftable level of the push inclines with respect to the pushed portion.

7. The apparatus as claimed in claim 6, further comprising a fastening device adapted to fix the end portion of the support frame onto the top of the main frame.

8. The apparatus as claimed in claim 7, wherein:

the support frame further comprises two flanks, disposed on two sides of the recess;

the fastening device comprises two screws, which position the support frame on the main frame through the two flanks, in which each of the screws comprises a head and a body; and the elastic-biasing device comprises two springs, each being disposed onto the body, and located between the head of each of the screws and each of the flanks thereby providing each flank a downward force.

\* \* \* \* \*